Dec. 30, 1941. A. H. STILES 2,268,529
PICTURE MOUNTING MEANS
Filed Nov. 21, 1938
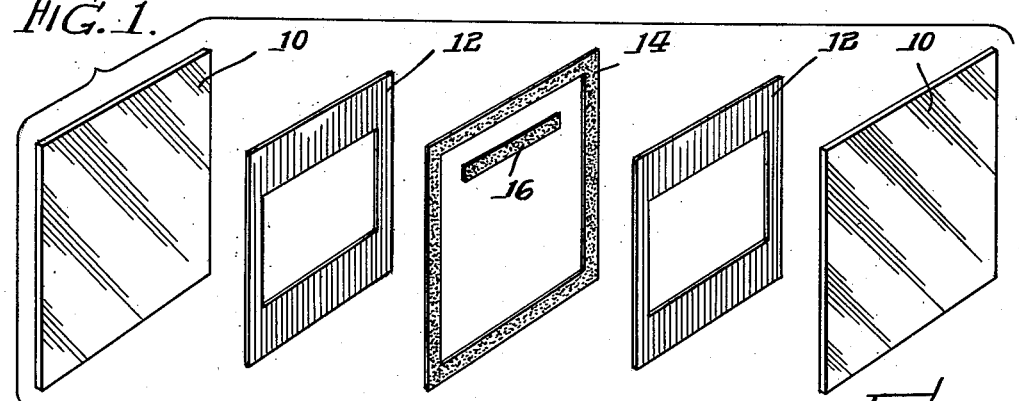
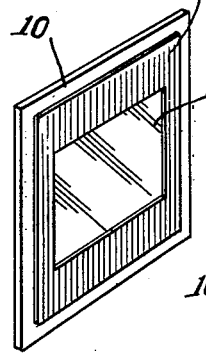
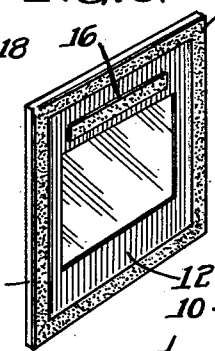
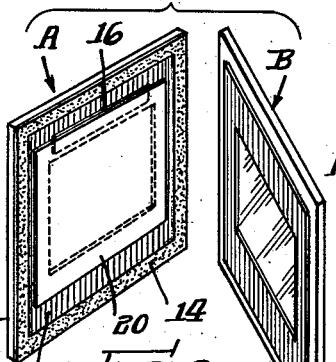
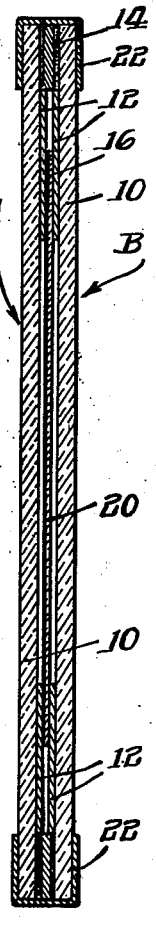
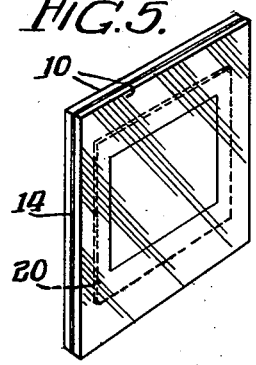
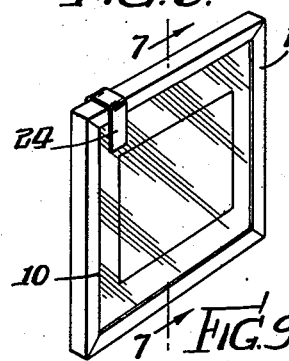
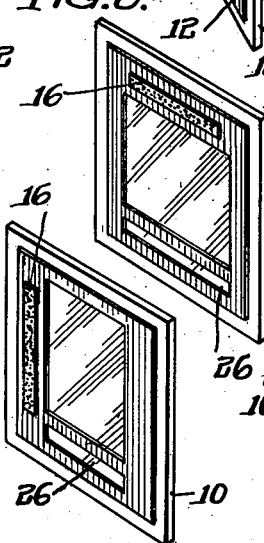
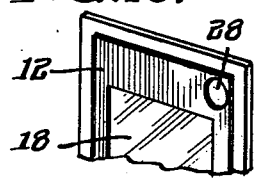
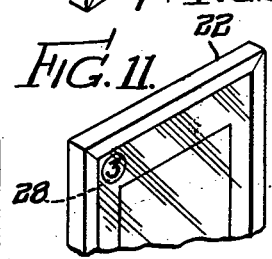
INVENTOR.
BY: Alfred H. Stiles
Cox & Moore ATTORNEYS.

Patented Dec. 30, 1941

2,268,529

UNITED STATES PATENT OFFICE 2,268,529

PICTURE MOUNTING MEANS

Alfred H. Stiles, Evanston, Ill.

Application November 21, 1938, Serial No. 241,498

12 Claims. (Cl. 40—152)

The present invention relates to means for mounting pictures, particularly pictures adapted to transmit light so as to be capable of projection or direct viewing under the influence of light transmission.

The present invention contemplates more particularly the provision of means for mounting pictures, such as positives, for viewing the image thereof under the influence of light transmission, which means permits rapid, convenient assembly while completely enclosing and sealing the picture.

Heretofore, in preparing positives for use as lantern slides, for example, it has been necessary to perform several rather tedious operations. In general, the positive was first cut to size and then placed within a mask of opaque sheet material apertured to correspond with the size of the picture. After centering the film with respect to the aperture and the mask, the assembly was then enclosed on both sides with two identical transparent sheets of glass. At this time it was necessary to clamp the assembly securely together and to apply tape about the peripheral edges to retain the pieces of glass together. It is tedious and difficult to maintain the several parts of the slides in exact alinement during assembly, particularly since the transparent parts must be kept perfectly clean and free from dust, finger prints and the like. Other devices have been proposed wherein the several parts are maintained together by clips or rigid enclosures, but in spite of the relatively increased cost and inconvenient increase in bulkiness the previous difficulties prevail in more or less degree.

In methods heretofore practiced the masking material frequently used comprised a section of relatively heavy paper folded together along a medial line. The film is secured between these pieces of paper and, as a result, the film is not contacted by the transparent plates. This leaves a considerable space between the opposite sides of the film and the complementary surfaces of the transparent plates, thereby enhancing the collection of dust and other particles which serve to obstruct a clear projection or visualizing of the image. In fact, these paper masks disintegrate particularly in the vicinity of the apertured portion thereof, tending to present a feathery edge, as distinguished from a sharp metallic edge. Due to the fact that the film is not contacted by the transparent plates, a tendency for poor focusing of the film results.

It is an important object of the present invention to obviate the above difficulties by providing an improved picture-supporting or slide structure, as well as elements for forming said slide structure, wherein the film may be rapidly and readily applied and the parts joined into a rigid unit merely by superposing a pair of prepared transparent elements.

Another object of the present invention is to provide a preformed assembly upon which the film may be instantly mounted by merely placing it into position and which may be closed by superposing a second transparent element which at the same times becomes firmly joined to seal the picture in operative position.

Other and further objects of the present invention are to provide transparent picture enclosing and supporting members having masking portions permanently mounted thereon and having their edge portions protected by sealing strip; to provide a unit as above adapted for sealing a second enclosing transparent member thereto when arranged in flatwise relationship; and to provide a unit generally as above wherein the masking member is formed of a continuous, non-transparent layer which is extremely thin, so that the image support will be firmly supported between the transparent members.

Yet other and further objects and advantages will be apparent throughout the course and progress of the following specification, wherein:

Fig. 1 is a perspective view of a slide assemblage constructed in accordance with the present invention, the parts being shown in disassembled or exploded relationship in order to more fully illustrate their construction;

Fig. 2 is a perspective view of a construction element employed in forming a slide in accordance with the present invention;

Fig. 3 is a perspective view similar to Fig. 2 but disclosing a part after an additional step in the process of manufacture and assemblage;

Fig. 4 is a perspective view showing the element of Fig. 3 with a positive film secured thereto preparatory to applying the opposing transparent enclosure, the latter member being shown in disassembled relationship to better illustrate the internal arrangement;

Fig. 5 is a perspective view of a finished slide constructed in accordance with the present invention;

Fig. 6 is a perspective view of a preferred alternative modification of the present invention;

Fig. 7 is a sectional view taken on the line 7—7 in Fig. 6;

Figs. 8, 9 and 10 are perspective views of alternative, modified preferred forms of closing elements which are employed to form slides; and Fig. 11 is a perspective view of a finished slide using the construction elements shown in Fig. 10.

Referring more particularly to the figures of the drawing wherein the present invention is illustrated more in detail, Figs. 1 to 5 illustrate one preferred form of a device constructed in accordance with the present invention and which in final assembled form is a slide of the type employed for projection purposes in a lantern or other projector. Fig. 5 illustrates the final assembled unit, while Figs. 1 to 4 exemplify the steps in the process of assemblage and use as well as the structural units which make up the finished device. The film or picture supporting elements in this embodiment comprise in general a pair of transparent plates 10, a pair of masking elements 12, a central joining or adhesive means 14 comprising a peripheral sealing means for joining together the various elements, and an inner sealing means 16 for promoting adherence of the film to the assemblage.

In the embodiment shown, the transparent members 10 are a pair of rectangular, congruent transparencies which may be formed of glass, although any other transparent sheet material may be employed. It is preferred that these members possess some rigidity so as to provide a support for the assemblage, but, as will hereinafter appear, these members may be relatively non-rigid, especially if other portions of the assemblage are so constructed as to perform this function. More specifically, the plates or transparencies 10 may be formed of cellulose acetate, Celluloid, "Cellophane," transparent viscose products and the like.

According to one manner of carrying out the present invention, one of the masking members 12 is placed flatwise upon the surface of the adjacent transparency, as shown in Fig. 2, and preferably glued or otherwise caused to adhere in place. In the preferred embodiment wherein the transparent member 10 is relatively stiff and self-supporting the masking member 12 may be correspondingly thin. It has been found that an ordinary opaque decalcomania is entirely suitable for this purpose. More particularly, the mask 12 is of rectangular configuration, having a rectangular aperture 18 of a size correspondig to the proposed picture. It will be obvious from the above disclosure that the mask is opaque. Instead of providing an aperture 18, the present invention comprehends an equivalent arrangement wherein the apertured portion is replaced by a transparent section. Such an embodiment is readily available in using a mask formed from a decalcomania, since the decalcomania design may be readily formed with an opaque masking portion and a rectangular central window before application to the transparency. In place of decalcomanias there may be employed any opaque sheet material, such as paper, various metal foils, or even opaque coatings, which may be secured in place by gums, adhesives or the like.

The joining strip 14 is next applied to the assemblage, as shown in Fig. 3. The strip 14 is of rectangular configuration and is of such size that it resides within the periphery of the transparency 10. It is contemplated for convenience that the securing strip 14 be permanently mounted upon the masked unit just described. This may be done through the agency of a layer of adhesive on the side of the strip 14 against the supporting unit. The side surface of the strip 14 which appears in Figs. 3 and 4 is similarly provided with gum or other adhesive to secure the entire unit together, as will hereinafter more fully appear. A strip of adhesive material 16 which may be identical in character with the strip 14 is permanently secured to the aforementioned assemblage just above the window (Fig. 3).

The procedure for assembling the above described units together with a film to provide a display slide is as follows: two preformed elements are necessary, namely, a masked transparency provided with joining strips, as shown in Fig. 3, and a masked transparency without the strips, as shown in Fig. 2. The transparency having the joining strips 14 and 16 may be laid on a table with the strips facing upwardly and a piece of negative film, designated by the reference numeral 20, placed flatwise thereon so that the picture is framed by the aperture or transparent portion of the mask. Contact with the adhesive strip 16 will firmly and positively secure the film in operative position. In order to complete the assemblage it is merely necessary to overlie the opposite masked transparency in identical relationship, whereupon the adhesive strip 14 may join the parts together as a finished unit. Thus, as shown in Fig. 4, the transparency designated by the reference numeral A comprises the ahesive strips 14 and 16, while the masked member B, which may be free from such adhesive means, is shown in position ready to be superposed to provide the finished unit.

In accordance with the present invention it will be obvious from the above that the strips 14 and 16 may comprise adhesive paper, cloth tape or Scotch tape, or alternatively there may be employed a suitable adhering material unsupported by a fabric web or the like provided that the adhesive material is not prone to run into the region of the picture. When employing the usual adhesive papers, the free adhesive surface, that is, the surface adapted to be secured to the unit B may necessarily be dampened before using. This may be accomplished by means of a brush or sponge. The same is true of the film mounting strip 16. It is preferred, however, to preform the strips 14 and 16 in such a manner that when assembled on the unit A they have an outer or free surface which does not require the addition of moisture to cause adhesiveness. Scotch tapes have this property and may, during transportation, be protected by a thin layer of any suitable fabric, which may be pulled off just prior to assembling the slide.

The finished slide is shown in Fig. 5, it being understood, of course, that in all of the views the parts are shown more or less diagrammatically, since the dimensions used in the figures provided for illustrative purposes are necessary to properly disclose the principles of the invention and do not purport to comprise relative proportions in detail. The alternative preferred embodiment disclosed in Figs. 6 and 7 is, in general, constructed identically with the embodiment shown in Fig. 5 but comprises additionally a peripheral binding strip 22 applied about the edges of the slide. Such a strip is not necessary in accordance with my invention, but may be preferred in order to produce a desired finished appearance and give additional life under difficult conditions of service. The binding strip 22 may comprise a gummed strip of suitable binding material applied in the known manner. It is extremely important to note, however, that this strip may be applied with great convenience, since the slide unit has already been completely assembled and it is no longer necessary to exercise extreme care in maintaining adjustment and assemblage of the parts while the strip is applied.

Fig. 6 discloses further an identification strip 24 provided adjacent one of the corners of the finished slide to designate the relationship at which the slide is presented to be projected. In place of applying a separate strip at this point, the present invention comprehends a continuation of the edge of the strip 14 up and over the edge of the adjacent transparency for this purpose.

While the adhesive members 14 and 16 may be of the same initial thickness, particularly where they are capable of being compressed or deformed under reasonable pressure, as shown in the sectional view of Fig. 7, it is preferred that the adhesive strip 16 be of relatively less thickness so that the space between the transparencies will readily accommodate the negative film while at the same time permitting secure adherence between the strip 14 and opposed unit designated by the letter B. If desired, the so-called strip 16 may comprise merely a localized coating of suitable adhesive gum, while the peripheral strip 14 may consist of a gummed tape, thereby to provide the desirable additional thickness for slightly spacing the plates.

In Figs. 8, 9 and 10 are disclosed modified forms of masked plates provided with apertures of alternative form. In Figs. 8 and 9 there is provided a lower slit or aperture 26 in the mask for the purpose of providing a title space. A small strip of relatively transparent material may be lettered with the desired title or caption and arranged in the space 26 before assemblage of the slide. Alternatively, the portion 26 may comprise a window, as aforementioned, which is transparent or partially transparent and capable of receiving lettering upon its surface. As above stated, a window of this character may be readily provided by a decalcomania transfer or the like. The picture framing aperture in the embodiment shown in Fig. 9 is formed for a relatively narrow, upstanding picture. A circular aperture 28 in the unit shown in Fig. 10 permits the insertion of an identification mark for each slide. Fig. 11 shows the finished slide constructed from the plate unit shown in Fig. 10 and being designated by the reference numeral 3.

It should be particularly noted that in the embodiment disclosed for purposes of illustration the masking layer 12 terminates short of the periphery of its transparent support a distance sufficient to permit mounting of the strip 14 directly upon the side surface of the transparency. In accordance with this preferred arrangement the attaching strip is directly secured to the adjacent transparent layer and when the two opposed transparencies are united as described in the foregoing remarks it is assured that these two members will be joined directly together in a finished assemblage and not through the intermediary of one or more layers of masking material. So too, the adhesive strip or layer 14 provides a protective enclosure to prevent the edges of the masking layer 12 from becoming loosened during handling. This is particularly important since, as pointed out above, the present invention contemplates particularly the provision of very thin masking layers 12, such as continuous layers of decalcomania transfer or very thin metal foil, so that the images are at all times substantially supported and readily positioned on both sides by the transparencies. It will be understood that the present invention contemplates extending the masking layer 12 to the periphery of the transparent member 10, if desired.

The present invention provides a very simple and efficient mounting means for transparent pictures which obviates the complex structures or the tedious assemblage operations heretofore necessary. The parts may be preferably provided in the form of the aforementioned units A and B, the unit A comprising adhering or attaching means, while the unit B consists of a cover adapted to overlie and enclose the film and to be secured to the opposed unit in the final assemblage. It will be understood, of course, that the design or configuration of the mask may be varied widely in accordance with the picture or display to be framed, and the mask may similarly be supplied with any desired identifying configuration or indicia. The present invention is, of course, preferably applicable to the provision of supports for pictures of the type which are to be viewed through the agency of an apparatus involving the transmission of illumination through the picture. So also, while the above illustrative slide comprises means for framing only one picture, it will be understood that the mask may be configurated to frame a plurality of pictures, either separate or in a single strip of film.

It is thought that the invention and numerous of its attendant advantages will be understood from the foregoing description, and it is obvious that numerous changes may be made in the form, construction and arrangement of the several parts without departing from the spirit or scope of the invention or sacrificing any of its attendant advantages, the form herein described being a preferred embodiment for the purpose of illustrating the invention.

The invention is hereby claimed as follows:

1. In a supporting means for a photographic image or the like adapted to be rendered readily visible by the transmission of light therethrough, a unit adapted to be employed in assembling a finished supporting means and comprising a continuous transparent sheet member, a masking member adhesively attached adjacent one side of said transparent sheet and having substantially opaque portions defining a window for said image, and adhesive means permanently stuck to the said side face of the transparent sheet member and presenting a free adherent surface outwardly of said side face.

2. In a supporting means for a photographic image or the like adapted to be rendered readily visible by the transmission of light therethrough, a unit adapted to be employed in assembling a finished supporting means and comprising a sheet of transparent material, a masking member adhering permanently to a side of said sheet member and having a transparent portion adapted to frame a photographic image or the like, and adhesive means adhesively secured to the masked side of said transparent sheet and being arranged at a point removed from the said transparent portion of said mask.

3. In a supporting means for a photographic image or the like adapted to be rendered readily visible by the transmission of light therethrough, a unit adapted to be employed in assembling a finished supporting means and comprising a sheet of transparent material, a masking member stuck to a side of said sheet member and being apertured to frame a photographic image or the like, and adhesive means fixedly arranged adjacent the masked side of said transparent sheet and being arranged at a point removed from the aperture of said mask, a portion of said adhesive means being located on the side surface adjacent the periphery of said transparent sheet, said adhesive means further comprising a localized adhesive portion on the substantially opaque portion of the mask and arranged to adhesively secure a portion of a photographic image supporting sheet or the like to said transparent member when the image is arranged in operative position with respect to the mask.

4. In a supporting means for a photographic image or the like, a unit comprising a sheet of transparent material having a mask of opaque material permanently secured to one side thereof, said opaque material providing a transparent window over a predetermined portion thereof, a strip of adhesive tape material stuck to the said side of the said transparent sheet and adjacent the peripheral portions thereof and presenting a free adherent surface outwardly of said side, and a second strip of adhesive material secured adjacent said transparent sheet internally of said peripheral strip adjacent said window and adapted to adhere to a photographic film or the like arranged in operative relationship to said mask.

5. In a supporting means for a photographic image or the like adapted to be rendered readily visible by the transmission of light therethrough, a unit adapted to be employed in assembling a finished supporting means and comprising a transparent sheet, a masking layer adjacent the surface of said transparent sheet defining a window or aperture for said image, said masking layer having its edges spaced a predetermined distance from the periphery of said transparent sheet, and adhesive means secured to said transparent sheet adjacent the periphery thereof at portions between the edge of said masking layer and the adjacent periphery of the transparent sheet whereby to protect the edges of the masking layer and to permit direct joining of opposed units for mounting a film or the like therebetween.

6. In a supporting means for a photographic image or the like adapted to be rendered readily visible by the transmission of light therethrough, a unit adapted to be employed in assembling a finished supporting means and comprising a transparent sheet, a masking layer adjacent the surface of said transparent sheet defining a window or aperture for said image, said masking layer having its edges spaced a predetermined distance from the periphery of said transparent sheet, and adhesive means secured to said transparent sheet adjacent the periphery thereof at portions between the edge of said masking layer and the adjacent periphery of the transparent sheet whereby to protect the edges of the masking layer, and adhesive means on said mask and adjacent said window for adhesively securing an image support with respect to said window.

7. A unit for use in assembling a mounting means for photographic image supports or the like, comprising a transparent sheet of material for enclosing a side of said support, a masking member adhesively secured adjacent the side surface of said transparent enclosure sheet and providing a transparent portion adapted to frame a photographic image or the like, adhesive means permanently adhered to the side surface of said unit along the marginal periphery thereof, said adhesive means presenting a free adherent face outwardly of said side surface, and central adhesive means secured to said unit adjacent said transparent portion of the mask and presenting a free outer adhesive surface for adhesively engaging an image support arranged in operative relationship to said transparent portion.

8. In a supporting means for a photographic image or the like adapted to be rendered readily visible by the transmission of light therethrough, a unit adapted to be employed in assembling a finished supporting means and comprising a continuous transparent sheet member, a masking member adhesively secured to one side of said transparent sheet and having substantially opaque portions defining a window for said image, and adhesive means permanently stuck to the said side face of the transparent sheet member adjacent the marginal periphery thereof and presenting a free adherent surface outwardly of said side face, and an opposed, transparent sheet member adapted to be adhesively received by said adherent surface for sealing an image bearing means between the transparent sheet members.

9. In a supporting means for a photographic image or the like adapted to be rendered readily visible by the transmission of light therethrough, a unit adapted to be employed in assembling a finished supporting means and comprising a continuous transparent member, a masking member securely adhered to a side face of said transparent member and being adapted to frame a photographic image or the like, adhesive means stuck to the side surface of said unit and presenting a free, adherent surface outwardly of the free side surface of said unit, and a second transparent member applied flatwise to said unit and adhesively received by said free, adherent surface, said adhesive means projecting a predetermined distance outwardly of the side surface of said unit whereby said members are spaced a predetermined distance sufficient to accommodate an image bearing film therebetween.

10. In a supporting means for a photographic image or the like adapted to be rendered readily visible by the transmission of light therethrough, a unit adapted to be employed in assembling a finished supporting means and comprising a sheet of transparent material, a masking member adhesively secured to a side surface of said sheet member and being adapted to frame a photographic image or the like, an adhesive member permanently stuck to the side surface of said unit and presenting a free, adherent surface outwardly of the free side surface of said masking member, and a second transparent member applicable to said unit with its side surface adhesively received by the said free, adherent surface, and said adhesive member extending outwardly to laterally space said unit and second transparent member a predetermined distance to accommodate therebetween an image bearing means.

11. A unit for use in assembling a mounting means for photographic image supports or the like, comprising a transparent sheet of material for enclosing a side of said support, a masking member secured adjacent the side surface of said transparent enclosure sheet and providing a transparent portion adapted to frame a photographic image or the like, peripheral adhesive means adjacent the side surface of said unit and adhesively secured to said side surface, said adhesive means presenting a free adherent face outwardly of said side surface, central adhesive means secured to said unit adjacent said transparent portion of the mask and presenting a free outer adhesive surface for adhesively engaging an image support arranged in operative relationship to said transparent portion, said first-named adhesive means extending laterally beyond said second-named adhesive means, and a second transparent unit adapted to be received by the said peripheral adhesive means in laterally spaced relation for receiving the image support between said units.

12. A unit for use in assembling a mounting means for photographic image supports or the like, comprising a transparent sheet of material for enclosing a side of said support, a masking member secured adjacent the side surface of said transparent enclosure sheet and providing a transparent portion adapted to frame a photographic image or the like, peripheral adhesive means adjacent the side surface of said unit and adhesively secured to said side surface, said adhesive means presenting a free adherent face outwardly of said side surface, and central adhesive means secured to said unit adjacent said transparent portion of the mask and presenting a free outer adhesive surface for adhesively engaging an image support arranged in operative relationship to said transparent portion, said first-named adhesive means extending laterally beyond said second-named adhesive means.

ALFRED H. STILES.